(12) United States Patent
Li et al.

(10) Patent No.: US 9,396,270 B2
(45) Date of Patent: Jul. 19, 2016

(54) CONTEXT AWARE RECOMMENDATION

(71) Applicants: Wen-Syan Li, Fremont, CA (US); Xingtian Shi, Shanghai (CN)

(72) Inventors: Wen-Syan Li, Fremont, CA (US); Xingtian Shi, Shanghai (CN)

(73) Assignee: SAP SE, Walldorf (DE)

( * ) Notice: Subject to any disclaimer, the term of this patent is extended or adjusted under 35 U.S.C. 154(b) by 442 days.

(21) Appl. No.: 13/934,799

(22) Filed: Jul. 3, 2013

(65) Prior Publication Data

US 2015/0006553 A1  Jan. 1, 2015

(30) Foreign Application Priority Data

Jun. 28, 2013 (CN) .......................... 2013 1 0270007

(51) Int. Cl.
G06F 7/00 (2006.01)
G06F 17/30 (2006.01)

(52) U.S. Cl.
CPC ............................. *G06F 17/30867* (2013.01)

(58) Field of Classification Search
CPC .............. G06F 17/30867; G06F 17/30; G06F 12/0897; G06F 15/17368; G06F 17/2241; G06F 17/30073; G06F 17/30221; G06F 17/30589
See application file for complete search history.

(56) References Cited

U.S. PATENT DOCUMENTS

| | | | |
|---|---|---|---|
| 7,974,960 B2 | 7/2011 | Leidig | |
| 8,171,035 B2 | 5/2012 | Song et al. | |
| 8,396,759 B2 | 3/2013 | Mehta et al. | |
| 8,452,797 B1 | 5/2013 | Paleja et al. | |
| 2007/0198506 A1 | 8/2007 | Rezaei et al. | |
| 2010/0058377 A1 | 3/2010 | Grob et al. | |
| 2011/0247036 A1* | 10/2011 | Adimatyam | H04N 5/44543 725/40 |
| 2011/0289015 A1 | 11/2011 | Mei et al. | |
| 2012/0101903 A1 | 4/2012 | Oh et al. | |
| 2012/0117015 A1 | 5/2012 | Sathish | |
| 2012/0278268 A1 | 11/2012 | Haemaelaeinen et al. | |
| 2012/0295640 A1* | 11/2012 | Mei | G06Q 30/02 455/456.3 |
| 2012/0316960 A1* | 12/2012 | Yang | G06Q 30/0251 705/14.53 |
| 2013/0103486 A1 | 4/2013 | Hess et al. | |
| 2013/0325623 A1* | 12/2013 | Balduf | G06Q 30/02 705/14.66 |

FOREIGN PATENT DOCUMENTS

WO  WO-2012038007 A2  3/2012

OTHER PUBLICATIONS

Raphaeel Thollot; Dynamic Situation Monitoring and Context-Aware BI Recommendations; Apr. 3, 2012; Ecole Centrale Paris; Paris; France; (http://tel.archives.ouvertes.fr/docs/00/71/89/17/pdf/thesis-thollot.pdf).
SAP AG; SAP® Business Suite Powered by SAP HANA; 2013; Accessed on Jul. 8, 2014; SAP AG; Walldorf; Germany; (http://www.sphana.com/servlet/iveservlet/previewbody/2946-102-3-7609/soh__overviewbrochure.pdf).

* cited by examiner

*Primary Examiner* — Azam Cheema
(74) *Attorney, Agent, or Firm* — Brake Hughes Bellermann LLP

(57) ABSTRACT

In accordance with aspects of the disclosure, systems and methods are provided for managing context aware recommendations by providing recommendations to a user in response to a query related to the user by integrating contextual information of a context related to the user in a recommendation model while considering a granular structure of the context and the contextual information thereof.

20 Claims, 7 Drawing Sheets

350

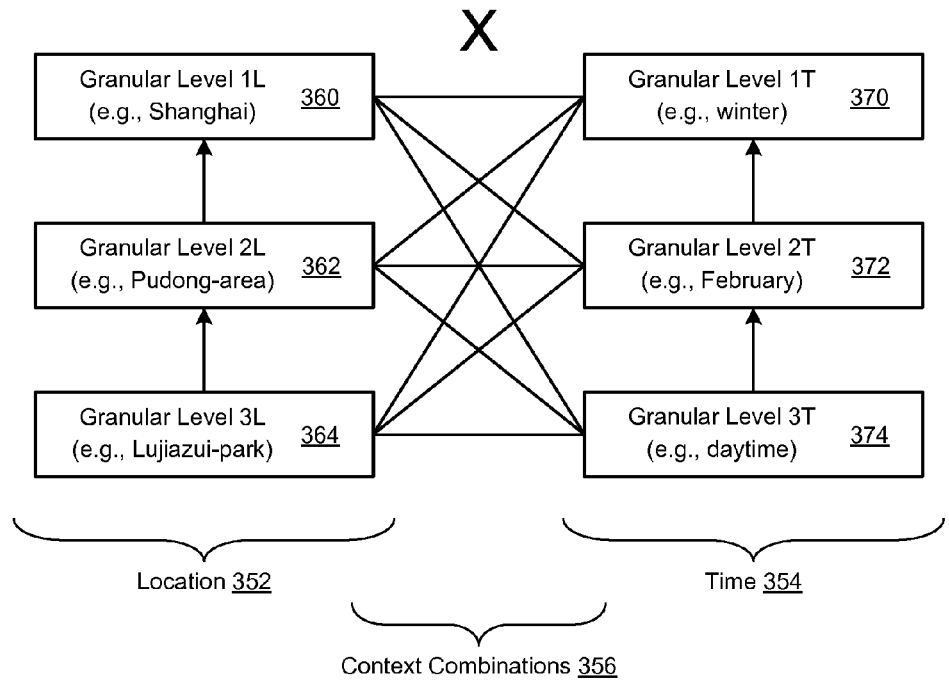

Table 380

| Context Granularity Path (CGP) | Granular Level 1T (e.g., winter) | Granular Level 2T (e.g., February) | Granular Level 3T (e.g., daytime) |
|---|---|---|---|
| Granular Level 1L (e.g., Shanghai) | <Shanghai,winter> | <Shanghai,February> | <Shanghai,daytime> |
| Granular Level 2L (e.g., Pudong-area) | <Pudong-area,winter> | <Pudong-area,February> | <Pudong-area,daytime> |
| Granular Level 3L (e.g., Lujiazui-park) | <Lujiazui-park,winter> | <Lujiazui-park,February> | <Lujiazui-park,daytime> |

FIG. 3B

CONTEXT AWARE RECOMMENDATION

CROSS-REFERENCE TO RELATED APPLICATION

This application claims priority under 35 U.S.C. §119 to Chinese Patent Application No. 201310270007.0, filed on Jun. 28, 2013, entitled "CONTEXT AWARE RECOMMENDATION", which is incorporated herein by reference in its entirety.

TECHNICAL FIELD

The present description relates to various computer-based techniques for context aware recommendation management.

BACKGROUND

Recent years have witnessed a fast growth in use of mobile devices and an explosion of online information needs, such as finding a best restaurant, searching for a tour spot, and/or looking for an apartment. To facilitate user demand for more accurate information, an improved recommendation technique is needed. Also, due to relatively small screen sizes of mobile devices compared with desktop displays, there is a need for more precise recommendations for showing a few candidates to display.

SUMMARY

In accordance with aspects of the disclosure, a computer system may be provided including instructions recorded on a non-transitory computer-readable medium and executable by at least one processor. The computer system may include a context aware recommendation manager configured to cause the at least one processor to provide one or more recommendations to a user in response to a query related to the user by integrating contextual information of a context related to the user in a recommendation model while considering a granular structure of the context and the contextual information thereof. The context aware recommendation manager may include a multi-granular context module configured to detect the context related to the user and determine the granular structure of the context including one or more structural elements of the granular structure based on the contextual information that characterizes information related to the user. The context aware recommendation manager may include a pre-filtering recommendation paradigm module configured to pre-filter the contextual information according one or more context combinations of relational paths between each structural element of the granular structure and select historical network navigation data related to the user for comparison with each context combination. The context aware recommendation manager may include a recommendation builder configured to model each context combination for the query in the recommendation model by calculating a recommendation performance for each different relational path as compared with the selected historical network navigation data while considering the granular structure of the context and the contextual information thereof, and determine at least one of the one or more context combinations having a best recommendation performance to thereby select one or more best context combinations for providing the one or more recommendations to the user in response to the query.

In an implementation the context may include multiple contexts and each of the multiple contexts includes a hierarchical structure with a multi-granular organization. The contextual information associated with the context may reveal an intent of the user for a query. The contextual information may include time and location of the query issued by the user. The recommendation builder may be configured to select the best context combination for <query, location, time>. The contextual information associated with the context may include a profile of the user including one or more of gender of the user, age of the user, personal interest of the user, salary of the user, likes and/or dislikes of the user, and one or more social networks associated with the user.

In an implementation, the structural elements of the granular structure of the context and the contextual information related to the user may include one or more granular levels and one or more granular components within each granular level. The multi-granular context module may be configured to automatically detect the context related to the user based on the historical network navigation data related to the user. The multi-granular context module may be configured to automatically detect dependencies between the structural elements of the context and the contextual information related to the user including dependencies between one or more granular levels and one or more granular components within each granular level.

In an implementation, the recommendation builder may include a trainer module that is configured to automatically discover one or more potentially predictive relationships and dependencies between the structural elements of the granular structure of the context and the contextual information related to the user. The recommender module may be configured to automatically detect the one or more best context combinations for the query as a context aware recommendation provided to the user.

In accordance with aspects of the disclosure, a computer-implemented method may be configured for providing one or more recommendations to a user in response to a query related to the user by integrating contextual information of a context related to the user in a recommendation model while considering a granular structure of the context and the contextual information thereof. The computer-implemented method may be configured for detecting the context related to the user, determining the granular structure of the context including one or more structural elements of the granular structure based on the contextual information that characterizes information related to the user, and pre-filtering the contextual information according one or more context combinations of relational paths between each structural element of the granular structure. The computer-implemented method may be configured for selecting historical network navigation data related to the user for comparison with each context combination, modeling each context combination for the query in the recommendation model by calculating a recommendation performance for each different relational path as compared with the selected historical network navigation data while considering the granular structure of the context and the contextual information thereof, and determining at least one of the one or more context combinations having a best recommendation performance to thereby select one or more best context combinations for providing the one or more recommendations to the user in response to the query.

In an implementation, the context may include multiple contexts, and each of the multiple contexts may include a hierarchical structure with a multi-granular organization. The contextual information associated with the context may reveal an intent of the user for a query. The contextual information may include time and location of the query issued by the user. The recommendation builder may be configured to select the best context combination for <query, location, time>. The contextual information associated with the context may include a profile of the user including one or more of gender of the user, age of the user, personal interest of the user, salary of the user, likes and/or dislikes of the user, and one or more social networks associated with the user. The structural elements of the granular structure of the context and the contextual information related to the user may include one or more granular levels and one or more granular components within each granular level.

In an implementation, the computer-implemented method may include one or more of automatically detecting the context related to the user based on the historical network navigation data related to the user, automatically detecting dependencies between the structural elements of the context and the contextual information related to the user including dependencies between one or more granular levels and one or more granular components within each granular level, automatically discovering one or more potentially predictive relationships and dependencies between the structural elements of the granular structure of the context and the contextual information related to the user, and automatically detecting the one or more best context combinations for the query as a context aware recommendation provided to the user.

In accordance with aspects of the disclosure, a computer program product may be provided that is tangibly embodied on a non-transitory computer-readable storage medium and including instructions that, when executed by at least one processor, may be configured to provide one or more recommendations to a user in response to a query related to the user by integrating contextual information of a context related to the user in a recommendation model while considering a granular structure of the context and the contextual information thereof. When executed by the at least one processor, the instructions may be configured to detect the context related to the user, determine the granular structure of the context including one or more structural elements of the granular structure based on the contextual information that characterizes information related to the user, and pre-filter the contextual information according one or more context combinations of relational paths between each structural element of the granular structure. When executed by the at least one processor, the instructions may be configured to select historical network navigation data related to the user for comparison with each context combination, model each context combination for the query in the recommendation model by calculating a recommendation performance for each different relational path as compared with the selected historical network navigation data while considering the granular structure of the context and the contextual information thereof, and determine at least one of the one or more context combinations having a best recommendation performance to thereby select one or more best context combinations for providing the one or more recommendations to the user in response to the query.

In an implementation, the context may include multiple contexts, and each of the multiple contexts may include a hierarchical structure with a multi-granular organization. The contextual information associated with the context may reveal an intent of the user for a query. The contextual information may include time and location of the query issued by the user. The recommendation builder may be configured to select the best context combination for <query, location, time>. The contextual information associated with the context may include a profile of the user including one or more of gender of the user, age of the user, personal interest of the user, salary of the user, likes and/or dislikes of the user, and one or more social networks associated with the user. The structural elements of the granular structure of the context and the contextual information related to the user may include one or more granular levels and one or more granular components within each granular level.

In an implementation, when executed by the processor, the instructions may be configured to automatically detect the context related to the user based on the historical network navigation data related to the user, automatically detect dependencies between the structural elements of the context and the contextual information related to the user including dependencies between one or more granular levels and one or more granular components within each granular level, automatically discover one or more potentially predictive relationships and dependencies between the structural elements of the granular structure of the context and the contextual information related to the user, and/or automatically detect the one or more best context combinations for the query as a context aware recommendation provided to the user.

BRIEF DESCRIPTION OF THE DRAWINGS

FIGS. 3A-3B are diagrams illustrating various example context granular combinations, in accordance with aspects of the disclosure.

DETAILED DESCRIPTION

Figure 1:
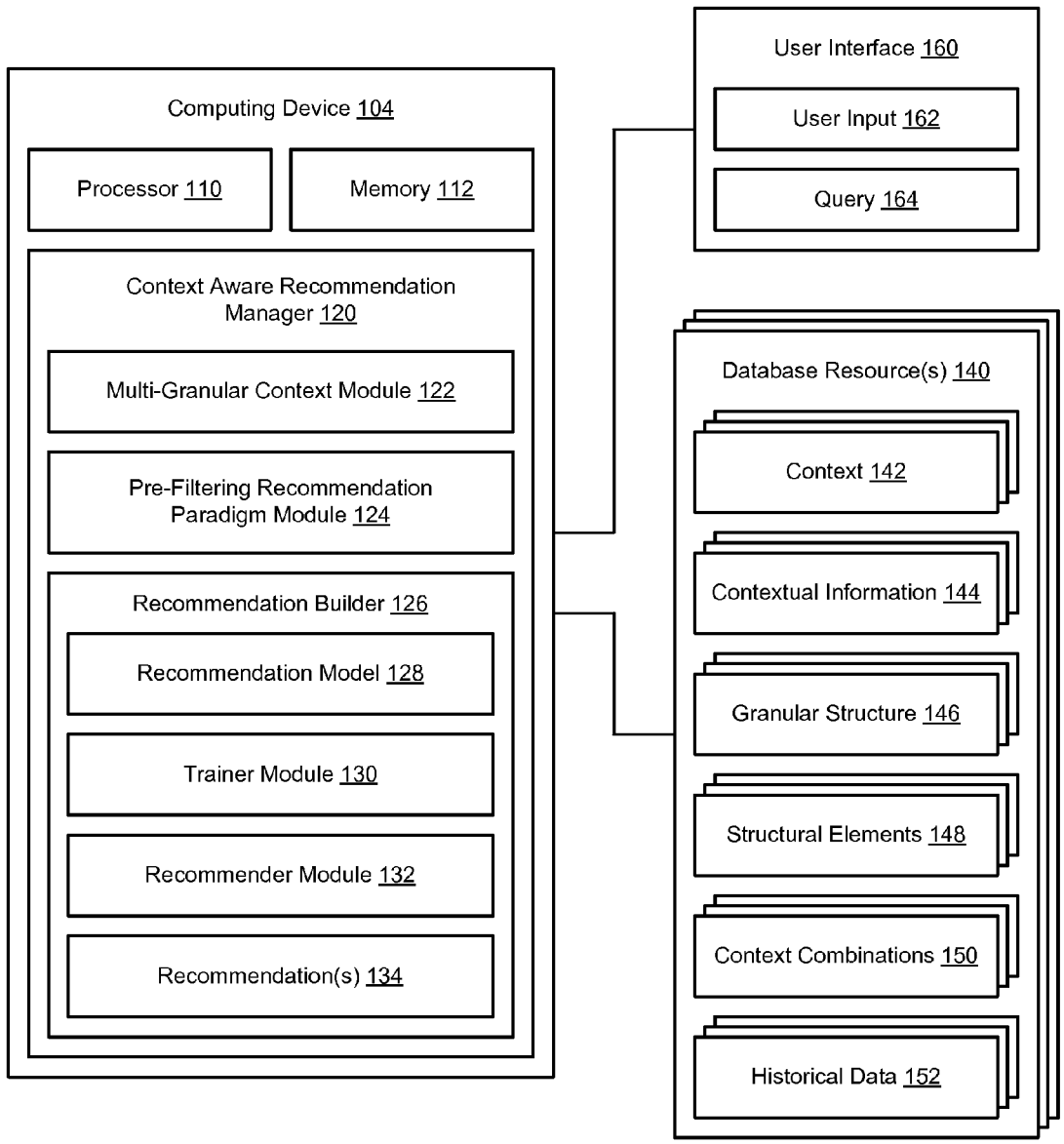
FIG. 1 is a block diagram illustrating an example system for context aware recommendation management, in accordance with aspects of the disclosure.

Contextual information, such as time and location, is easily accessible in some online services due to Web 2.0 and to wide use of mobile devices. In accordance with aspects of the disclosure, a context aware recommendation system provided herein may be configured to improve a user's satisfaction on recommendations by tailoring some particular contexts related to the user. An effect of multiple contexts with a granularity structure may be considered important to recommendation performance. Further, how to detect a best context combination for recommendation with regard to a given input is described herein. In accordance with aspects of the disclosure, a framework for using one or more various types of contexts including, for example, time and/or location contexts is provided herein for the context aware recommendation system, which is configured to provide better recommendations for the user and for enhancing user experiences in a network setting. Along with the system, a method is also provided to automatically detect context dependencies for recommendations.

Further, mobile devices and Web 2.0 provide for access to rich contextual information within a context. For a tour spot recommendation task, time and location of a query may be issued along with a query language and user profile information, such as, for example, gender, age, salary, personal interest, and social network/media, shopping list, etc., which may be considered important contexts related to the user to utilize for better recommendations. For instance, a tourist (user) may input a "tour event" for some recommendation events near, e.g., the Eiffel Tower in Paris. If the system and method know that at this specific location, for some previous queries in a log data, some hit recommendations may include "taking photo of the tower", "buying souvenir", then the system and method may recommend one or more of these ideas to the user if the location context is used. If another user issues a same query on the night of, e.g., July 14 at the same place, along with the mentioned recommended events, more recommended events including, e.g., "Bastille Day parade" and "fireworks show" may be further provided to the user as recommendations. As illustrated by example, a recommendation system and methods may utilize rich contextual information for better recommendations.

In accordance with aspects of the disclosure, the recommendation system and methods are configured to provide content-based recommendations and collaborative filtering of contextual information related to a context. Further, the recommendation system and methods are configured to integrate contextual information of a context in a recommendation model. Accordingly, the recommendation system and methods provided herein are configured to provide a framework that exploits a rich set of context(s) and contextual information in recommendation models while considering a context structure of the context(s) and contextual information related to each context. A context-sensitive system and methods may be further provided to develop granularity of each context and detect a best context combination therefor. As described herein, the system and methods introduce an expression of multi-granular context and provide a pre-filtering paradigm of a recommendation task. The system and methods may be further configured to select the best context combination when granularity is developed, and a running sample is further described herein to illustrate how the approach functions, works, and/or operates.

FIG. 1 is a block diagram illustrating an example system 100 for context aware recommendation management, in accordance with aspects of the disclosure.

In the example of FIG. 1, the system 100 comprises a computer system for implementing a context aware recommendation management system that may be associated with a computing device 104, thereby transforming the computing device 104 into a special purpose machine designed to determine and implement context aware recommendation process(es), as described herein. In this sense, it may be appreciated that the computing device 104 may include any standard element(s) and/or component(s), including at least one processor(s) 110, memory (e.g., non-transitory computer-readable storage medium) 112, one or more database resource(s) 140, power, peripherals, and various other computing elements and/or components that may not be specifically shown in FIG. 1. Further, the system 100 may be associated with a user interface (UI) 160 (e.g., various electronic input devices) that may be used to receive user input 162 via, such as, in an example, a graphical user interface (GUI). In an implementation, the UI 160 may be used, for example, to receive various preferences from a user for managing or utilizing the system 100. Accordingly, it should be appreciated that various other elements and/or components of the system 100 that may be useful to implement the system 100 may be added or included, as would be apparent to one of ordinary skill in the art.

In the example of FIG. 1, the context aware recommendation management system 100 may include the computing device 104 and instructions recorded on the non-transitory computer-readable medium 112 and executable by the at least one processor 110. The computing device 104 is configured to access and communicate with the one or more database resource(s) 140, which may include local resource(s), remote resource(s), peripheral resource(s), internal resource(s), external resource(s), and/or network based resource(s). As such, in some examples, the context aware recommendation management system 100 may include the user interface (UI) 160 for receiving various input from the user and/or for providing various output to the user.

The context aware recommendation management system 100 may include a context aware recommendation manager 120 configured to cause the at least one processor 110 to provide one or more recommendations 134 to a user in response to a query 164 related to the user by integrating contextual information 144 of a context 142 related to the user in a recommendation model 128 while considering a granular structure 146 of the context 142 and the contextual information 144 thereof. The context aware recommendation manager 120 of the computing device 104 may be configured to receive a query 164 (one or more queries) from the user via the user interface (UI) 160.

In an implementation, the context aware recommendation manager 120 may be configured to introduce an expression of a multi-granular context and provide a pre-filtering paradigm o a recommendation task. The context aware recommendation manager 120 may be further configured to select a best context combination (bcc) and granularity with a running sample to show how the approach may function.

In various examples, the computing device 104 may be implemented using any appropriate combination of hardware and/or software configured for wired and/or wireless communication over a network. In an implementation, the computing device 104 may be implemented as server (e.g., a network server) adapted for communication over a network. In another example, the computing device 104 may be implemented as a mobile communication device (e.g., wireless cellular phone) adapted for communication with a network. In other examples, the computing device 104 may be implemented as a personal computer (PC), a personal digital assistant (PDA), a laptop computer, a tablet computer, a notebook computer, and/or various other generally known types of wired and/or wireless computing devices configured for communication with a network. Thus, in various implementations, the computing device 104 may be referred to as a server computing device for a network.

In various examples, the user interface (UI) 160 may be implemented as a device using any appropriate combination of hardware and/or software configured for wired and/or wireless communication over a network. In an example, the UI device 160 may be implemented as a mobile communication device (e.g., wireless cellular phone) adapted for communication with a network. In other examples, the UI device 160 may be implemented as a PC, a PDA, a laptop computer, a tablet computer, a notebook computer, and/or various other known types of wired and/or wireless computing devices configured for communication with a network. Thus, in various examples, the UI device 160 may be referred to as user devices, client devices, and/or customer devices. Further, the UI 160 may include at least one visual monitoring component, such as, for example, a liquid crystal display (LCD), or some other display device. The UI 160 may include at least one audio input/output component, such as, for example, a microphone, speaker, or some other audio input/output device.

In various examples, the computing device 104 and the user interface (UI) device 160 may be configured to communicate over a network that may be implemented as a single network or a combination of multiple networks. For example, the network may include a wireless telecommunications network (e.g., cellular telephone network) adapted for communication with one or more other communication networks, such as the Internet. In other examples, the network may include the Internet, one or more intranets, landline networks, wireless networks, and/or one or more other appropriate types of communication networks. As such, in various implementations, the computing device 104 and the user interface (UI) device 160 may be associated with a particular link (e.g., a link, such as a URL (Uniform Resource Locator) to an IP (Internet Protocol) address).

The context aware recommendation manager 120 may include a multi-granular context module 122 configured to detect the context 142 related to the user and determine the granular structure 146 of the context 142 including one or more structural elements 148 of the granular structure 146 based on the contextual information 144 that characterizes information related to the user. The multi-granular context module 122 may be configured to automatically detect the context 142 related to the user based on the historical network navigation data 152 related to the user.

In various examples, the context 142 may include a hierarchical structure with a multi-granular organization. The context 142 may include one or more contexts including one or more different contexts. The context 142 may include multiple contexts, and each of the multiple contexts may include a hierarchical structure with a multi-granular organization.

In various examples, the contextual information 144 associated with the context 142 may reveal an intent of the user for a query 164. The contextual information may include time and/or location of the query 164 issued by the user via the UI 162. As described further herein, the recommendation builder 126 may be configured to select a best context combination for <query, location, time>.

In various examples, the contextual information 144 associated with the context 142 may include a profile of the user including various information related to the user, such as, for example, one or more of gender of the user, age of the user, personal interest of the user, salary/wages/employment of the user, shopping list associated with the user, various likes and dislikes of the user, and one or more social networks/media associated with the user.

In various examples, the structural elements 148 of the granular structure 149 of the context 142 and the contextual information 144 related to the user may include one or more granular levels and one or more granular components within each granular level. The multi-granular context module 122 may be configured to automatically detect dependencies between the structural elements 148 of the context 142 and the contextual information 144 related to the user including dependencies between one or more granular levels and one or more granular components within each granular level.

The context aware recommendation manager 120 may include a pre-filtering recommendation paradigm module 124 configured to pre-filter the contextual information 144 according one or more context combinations 150 of relational paths between each structural element 148 of the granular structure 146. The pre-filtering recommendation paradigm module 124 may be configured to select historical data (e.g., historical network navigation data) 152 related to the user for comparison with each context combination 150.

The context aware recommendation manager 120 may include a recommendation builder 126 configured to model each context combination 150 for the query 164 in the recommendation model 128 by calculating a recommendation performance for each different relational path as compared with the selected historical network navigation data 152 while considering the granular structure 146 of the context 142 and the contextual information 144 thereof.

The recommendation builder 126 may be configured to determine at least one of the one or more context combinations 150 having a best recommendation performance to thereby select one or more best context combinations for providing the one or more recommendations 134 to the user in response to the query 164.

The recommendation builder 126 may include a trainer module 130 configured to automatically discover one or more potentially predictive relationships and dependencies between the structural elements 148 of the granular structure 146 of the context 142 and the contextual information 144 related to the user.

The recommendation builder 126 may include a recommender module 132 configured to automatically detect the one or more best context combinations for the query 164 as a context aware recommendation provided to the user in response to receiving and/or processing the query 164.

In the example of FIG. 1, it should be appreciated that the context aware recommendation management system 100 is illustrated using various functional blocks or modules that represent more-or-less discrete functionality. However, such illustration is provided for clarity and convenience, and thus, it should be appreciated that the various functionalities may overlap or be combined within a described block(s) or module (s), and/or may be implemented by one or more block(s) or module(s) not specifically shown or illustrated in the example of FIG. 1. Accordingly, it should be appreciated that various conventional functionality that may be considered useful to the system 100 of FIG. 1 may be included as well even though such conventional elements are not illustrated explicitly, for the sake of clarity and convenience.

Figure 2:
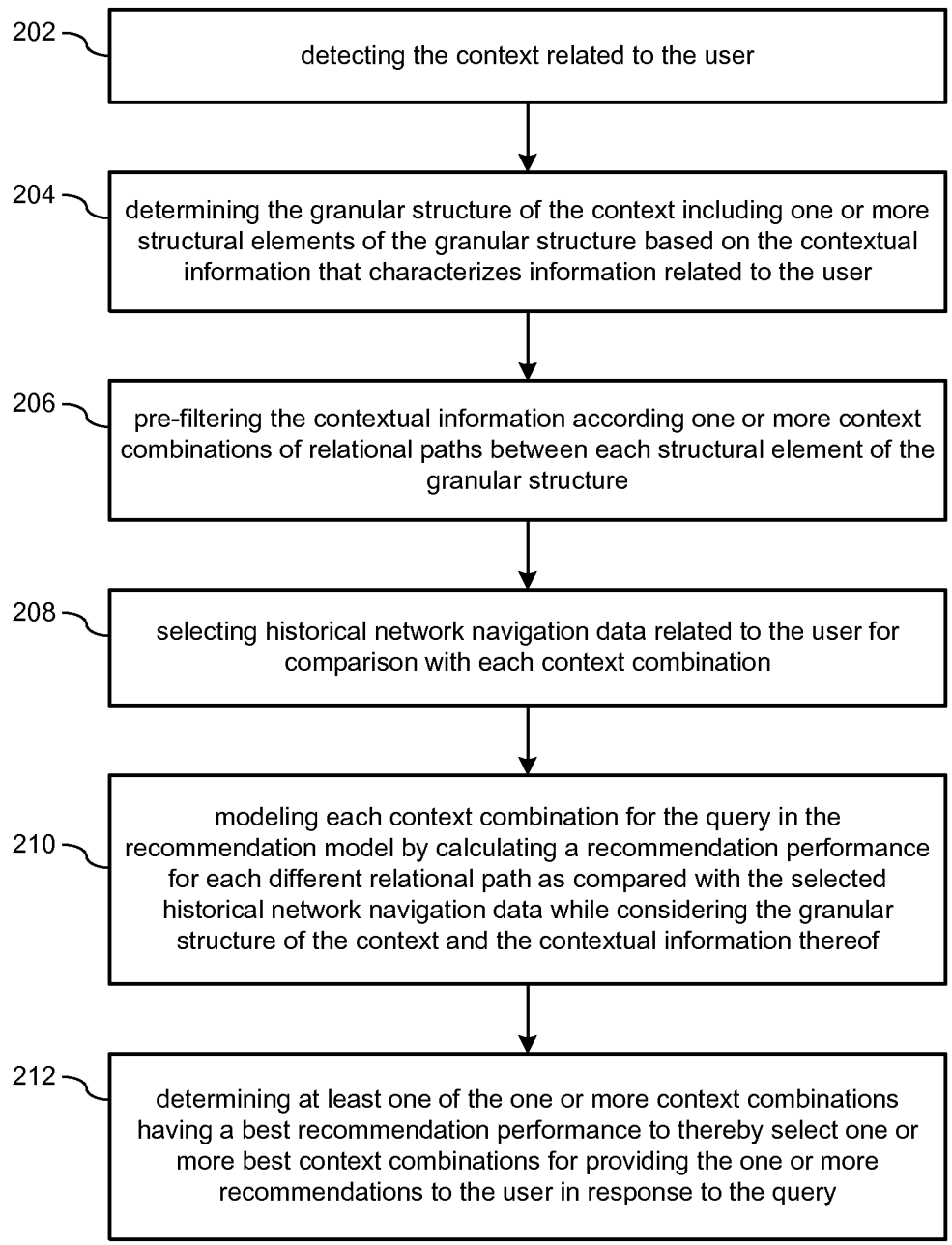
FIG. 2 is a process flow illustrating an example method for managing context aware recommendation, in accordance with aspects of the disclosure.

FIG. 2 is a process flow illustrating an example method 200 for managing context aware recommendations, in accordance with aspects of the disclosure.

In the example of FIG. 2, operations 202-212 are illustrated as discrete operations occurring in sequential order. However, it should be appreciated that, in other implementations, two or more of the operations 202-212 may occur in a partially or completely overlapping or parallel manner, or in a nested or looped manner, or may occur in a different order than that shown. Further, various additional operations, that may not be specifically shown or illustrated in the example of FIG. 2, may be included in some implementations, while, in other implementations, one or more of the operations 202-212 may be omitted. Further, in various other implementations, the method 200 may include a process flow for a computer-implemented method for context aware recommendation management in the system 100 of FIG. 1. Further, the operations 202-212 may provide a simplified operational process flow that may be enacted by the computer system 104 to provide features and functionalities as described in reference to FIG. 1.

In accordance with aspects of the disclosure, the method 200 of FIG. 2 may be configured for providing one or more recommendations to a user in response to a query related to the user by integrating contextual information of a context related to the user in a recommendation model while considering a granular structure of the context and the contextual information thereof.

In the example of FIG. 2, at 202, the method 200 may include detecting the context related to the user. At 204, the method 200 may include determining the granular structure of the context including one or more structural elements of the granular structure based on the contextual information that characterizes information related to the user. At 206, the method 200 may include pre-filtering the contextual information according one or more context combinations of relational paths between each structural element of the granular structure. Further, at 208, the method 200 may include selecting historical network navigation data related to the user for comparison with each context combination. At 210, the method 200 may include modeling each context combination for the query in the recommendation model by calculating a recommendation performance for each different relational path as compared with the selected historical network navigation data while considering the granular structure of the context and the contextual information thereof. At 212, the method 200 may include determining at least one of the one or more context combinations having a best recommendation performance to thereby select one or more best context combinations for providing the one or more recommendations to the user in response to the query.

In various examples, the method 200 may include automatically detecting the context related to the user based on the historical network navigation data related to the user. The method 200 may include automatically detecting dependencies between the structural elements of the context and the contextual information related to the user including dependencies between one or more granular levels and one or more granular components within each granular level. The method 200 may include automatically discovering one or more potentially predictive relationships and dependencies between the structural elements of the granular structure of the context and the contextual information related to the user. The method 200 may include automatically detecting the one or more best context combinations for the query as a context aware recommendation provided to the user.

Figure 3A:
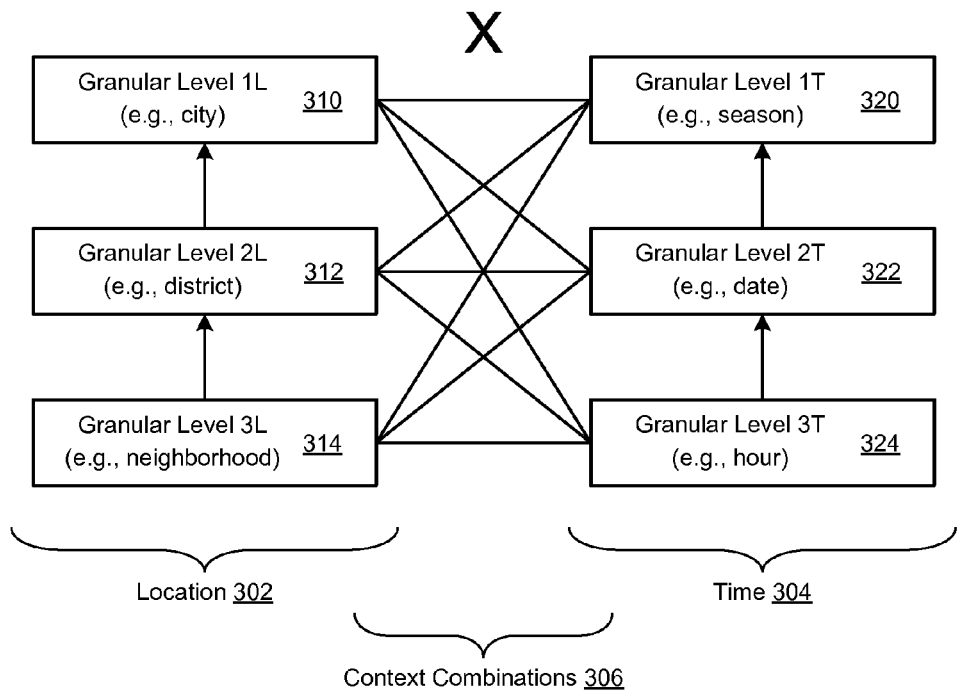

FIG. 3A is a diagram illustrating an example context granular combination 300, in accordance with aspects of the disclosure. For instance, in an implementation, FIG. 3A illustrates an example context combination 306 (e.g., Cartesian product) and at least one corresponding table 330 of the context combination 306 showing, for example, at least nine (9) possible context combinations for at least two different granularity paths (e.g., granular path for location 302 and granular path for time 304).

In reference to the recommendation model, aspects of the disclosure may be configured to introduce an expression of a multi-granular context and provide a pre-filtering paradigm of a recommendation task. Further, the method of selecting a best context combination and granularity may be provided, and a running sample may be given to show how the approach may function, work, or operate.

The multi-granular context may be configured to provide a wide range of implementations. For instance, in a recommendation setting, the context may refer to the contextual information, which may refer to the information that characterizes the user's information need as a request. The contextual information may reveal the user's intent for a query. In various examples, time and/or location of the query may be issued, query language may be provided, and/or one or more user profiles (e.g., gender, age, personal interest, salary, and social network/media, etc.) may be included in the context, which the system and methods provided herein may utilize to generate better recommendations.

In various examples, the context may include a hierarchical structure and a multiple-granular organization that may be employed, utilized, and/or implemented to generate one or more context aware recommendations. For instance, a location context may include one or more different granularities and/or granular levels, elements, components, etc., such as, e.g., neighborhood, district, city, region, country, etc.

In the example of FIG. 3A, if a query is issued at a specific global positioning system (GPS) location path of or as, e.g., <latitude, longitude>, the location context granularity may refer to, e.g., <city, district, neighborhood>. For example, a granular level 1L 310 may refer to a city location, a granular level 2L 312 may refer to a district location, and a granular level 3L 314 may refer to a neighborhood location. This expression of the multi-granular context may be referred to as a context granularity path (CGP). In another instance, a time context may include a similar reference property, such as the time context that may have a context granularity path of or as, e.g., <season, date, hour>. For example, a granular level 1T 320 may refer to a season time, a granular level 2L 322 may refer to a date time, and a granular level 3L 324 may refer to a hour time. In various examples, the context structure may be obtained by a pre-defined ontology. In some instances, the context combination (cc) may be defined as a Cartesian product of the context granularity paths for one or more instances. For example, FIG. 3A shows the Cartesian product of the context combination 306, and a table 330 shows the possible context combinations for the above mentioned two granularity paths.

The granular structure of the context may include one or more structural elements of the granular structure based on the contextual information that characterizes information related to the user. The structural elements of the granular structure of the context and the contextual information related to the user may include one or more granular levels and one or more granular components within each granular level. The structural elements may be referred to as granular elements, granular levels, or granular components. The season time may refer to any seasonal time including spring, summer, fall (autumn), winter, holidays, memorials, celebrations, etc. The date time may refer to any date time including date, century, decade, year, month, day, hour, minute, second, holiday, memorial, historical significance, etc.

Generally, in mathematics, a Cartesian product may be referred to as a mathematical operation that provides a set (or product set) from multiple sets. In this example, for sets A and B, the Cartesian product A×B may include a set of all ordered pairs (a,b) where a∈A and b∈B.

In some examples, rich contexts may refer to instances where there are multiple contexts available and one or more of these contexts may include hierarchical structures. When there are rich contexts for recommendation tasks, a process of utilizing the information to improve a recommendation performance involves interesting aspects for various implementations of the present disclosure.

FIG. 3B is a diagram illustrating an example context granular combination 350, in accordance with aspects of the disclosure. For instance, in an implementation, FIG. 3B illustrates an example context combination 356 (e.g., Cartesian product) and at least one corresponding table 380 of the context combination 356 showing, for example, at least nine (9) possible context combinations for at least two different granularity paths (e.g., granular path for location 352 and granular path for time 354). FIG. 3B represents an example implementation of FIG. 3A.

In various examples, as previously described, the context may include a hierarchical structure and a multiple-granular organization that may be implemented to generate one or more context aware recommendations. For instance, a location context may include several granularities, such as, for example, neighborhood, district, city, region, country, etc. In the example of FIG. 3B, if a query is issued at a sample GPS location of, e.g., <latitude=31.237857, longitude=121.505946>, the location context granularity may refer to, for example, <Shanghai (city), Pudding Area (district), Lujiazui-park (neighborhood)>. For instance, in an implementation, a granular level 1L 360 may refer to a city location of, e.g., Shanghai, a granular level 2L 362 may refer to a district location of, e.g., Pudong-area, and a granular level 3L 364 may refer to a neighborhood location of, e.g., Lujiazui-park. In another example, a sample time context may include a similar reference property. For instance, in another implementation, 2012-02-08-14:30 may have a context granularity path of, for example, <winter, February, daytime>. For example, a granular level 1T 370 may refer to a season time of, e.g., winter, a granular level 2L 372 may refer to a date time of, e.g., February, and a granular level 3L 374 may refer to a hour time of, e.g., daytime. In some instances, the CC may be defined as a Cartesian product of all context granularity paths for one instance. For example, FIG. 3B shows the Cartesian product of the context combination 356, and a table 380 shows all 9 possible context combinations for the above mentioned two granularity paths.

Figure 4:
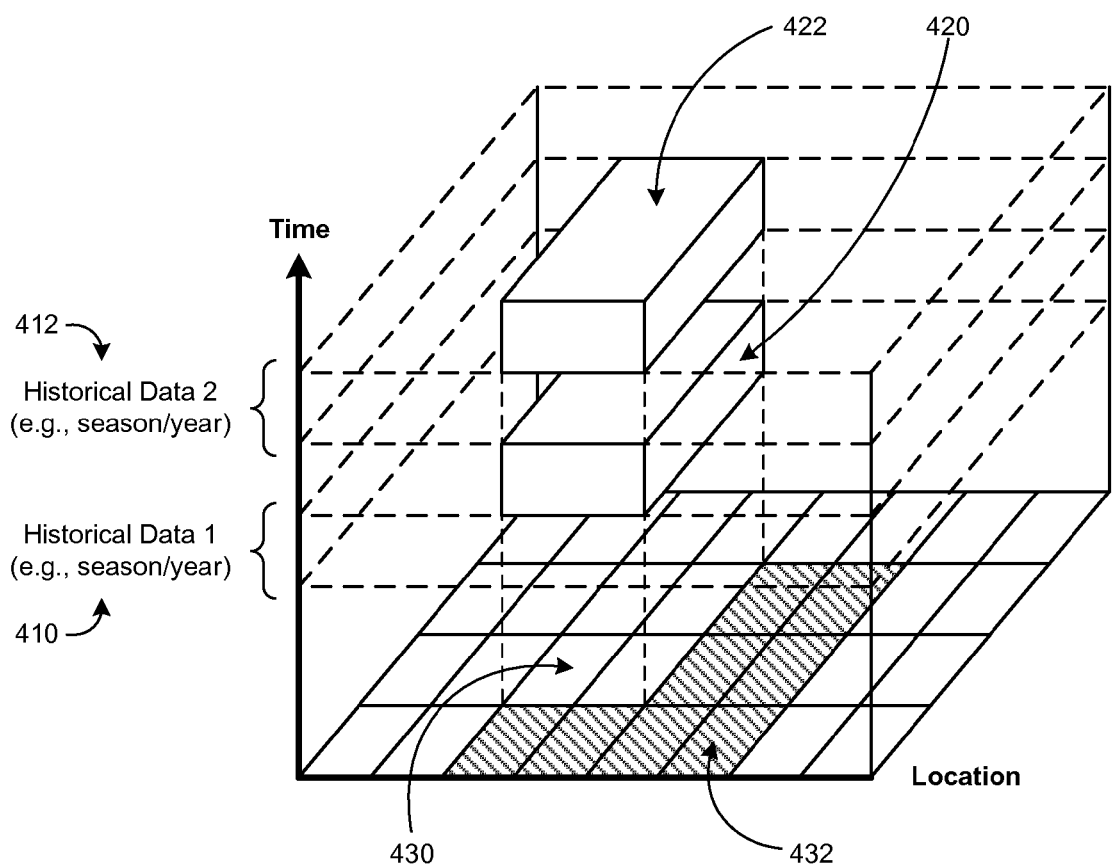
FIG. 4 is a diagram illustrating an example pre-filtering paradigm, in accordance with aspects of the disclosure.

FIG. 4 is a diagram illustrating an example pre-filtering paradigm 400, in accordance with aspects of the disclosure. In some examples, the example pre-filtering paradigm 400 may be referred to as a pre-filtering recommendation paradigm.

In various implementations, aspects of the present disclosure may be configured to employ a pre-filtering data model in various example recommendations including recommendations. For instance, the system 100 may select historic data as represented within a high-dimensional cube space 402 having one or more sectional spaces, such as, for example, a first historic data sectional space 410 and a second historic data sectional space 412, which may each represent different seasons and/or years, such as, for example, winter 2011 and winter 2012, respectively. In various examples, the historic data may include historical network navigation data related to the user (e.g., a user click-through log) to certain context combination, and based on the selected historic data, the recommendation may be returned as a result.

Further, FIG. 4 shows an example of how the pre-filtering paradigm may function, work, or operate. In various implementations, the pre-filtering paradigm 400 may be configured to determine and/or identify one or more sub-tubes of historic data that may be used for a recommendation. For instance, a first sub-tube 420 may be determined and/or identified within the first historic data sectional space 410, and a second sub-tube 422 may be determined and/or identified within the second historic data sectional space 412. For example, in an implementation, one instance of a picture may be taken in location Lujiazui-park 430 at time 2012-02-08-14:30 (e.g., the time represented by the historic data 412) of Pudong-area 432. The system 100 may select instances or pictures previously taken in winter 2012 (e.g., historic data 412) and at location Lujiazui-park 430, and based on the selected data represented by the second sub-tube 422, a recommendation may be provided to the user.

Figure 5:
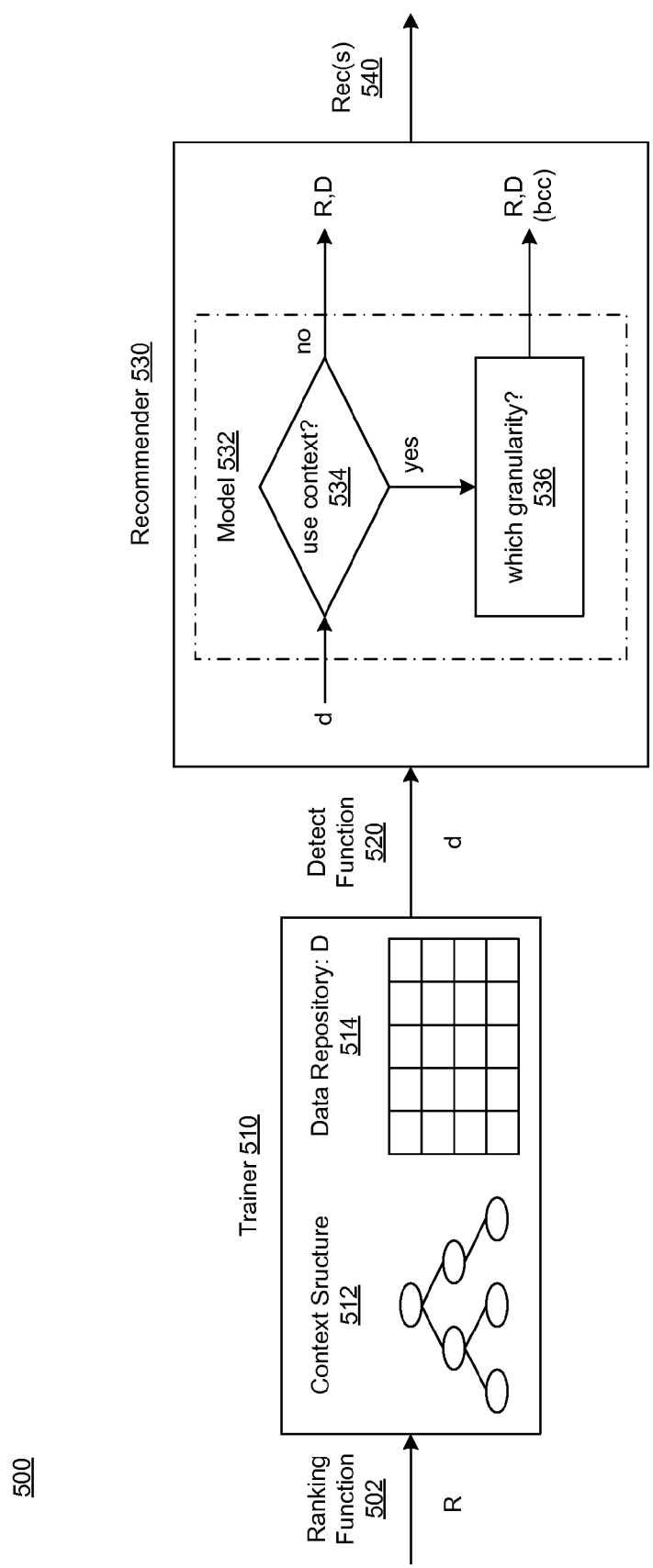
FIG. 5 is a diagram illustrating an example component of the system, in accordance with aspects of the disclosure.

FIG. 5 is a diagram illustrating an example component 500 of the system 100, in accordance with aspects of the disclosure. In some implementations, the example component 500 may be referred to as a framework of the recommendation model.

In the example of FIG. 5, the recommendation task may be divided into one or more parts including a trainer 510 and/or a recommender 530.

The trainer 510 may be configured as a process to discover potentially predictive relationships between recommendations and contexts, and the trainer 510 may include an offline trainer. The input of the trainer 510 may include a ranking function that may represent any recommendation method, such as, for example, content-based or collaborative filtering. For example, in an implementation:

Ranking Function (R) 502:

$$R(query_i, candidate_j) \rightarrow \mathbb{R}$$

where R may represent any method used to rank a candidate: $candidate_j$ according to a given query: $query_i$.

R may be used to find a co-occurrence of the <$query_i$, $candidate_j$> pair in the historic click-through data.

Context Structure 512 and Data Repository D 514 may be represented by:

$$d = <query, \{clicktrough\ data\}, cgp_{loc}, cgp_{time}>$$

where d is one log for one query in historic data and {clicktrough data} are the recommendations that the user is interested in (clicked) to when querying the information.

The trainer 510 outputs the Detect Function 520, denoted as:

$$H(query) \rightarrow best\ cc$$

which decides the appropriate context combination (cc) for query. The trainer may be built offline. In various implementations, the manner in which to generate the detect function is a focus of the disclosure.

During an online phase, the recommender 530 receives the query as an input. The query may include query information including, for example, location and time information. H(query) may first detect a best context combination (bcc), and then based on the selected data on D over bcc as described before (i.e., the selection operation over D according to bcc), R may return a set of one or more recommendations. FIG. 5 shows how the trainer 510 and the recommender 530 work to find a context aware recommendation. Further description in provided herein.

FIG. 5 further illustrates the design for the H(query). There are some training samples to build the model 532 for H(query). One idea is that, for each training sample, the data may be selected over different context granularities, and based on the select data, one or more recommendations 540 may be made by Rand. The recommender 530 may be configured to test a recommendation performance compared with a ground truth of the training samples under some measurement. After all of the training samples are run, the recommender 530 may infer from the results a best context combination (bcc) for each context combination (cc).

Further, in an implementation, the recommender 530 may be configured to identify an appropriate context combination (cc) that is not only dependent on the current contextual information. The given query should also be taken into consideration since the given query provides more information of the picture and reveals the user's intent of the information need. In the example of the H(query) model 532, a decision 534 may be made as whether to use context, wherein the decision 534 may be biased based on the context. If the decision 534 output is no, then the (query) model 532 outputs the context combination (cc) with the query results R and the data D for the recommendation 540. If the decision 534 output is yes, then the (query) model 532 selects which granularity 536 to use, and the (query) model 532 outputs the best context combination (bcc) with the best query results R and the best data D for the recommendation 540.

For example, in an implementation, when only location is considered, for queries taken at Lujiazui-park with a query, such as, for example, "party" or "wedding photo", a best location granularity for recommendation may be at neighborhood level. If a query is issued at Lujiazui-park and the user query is "apartment rent", the best location granularity may be district level since "apartment rent" may reveal that the user's need on location for the query does not actually have to be located in the park. In the examples, even for the queries in a same context, the appropriate context granularly may be different since the picture semantics may be different. Thus, aspects of the disclosure may be configured to find a best context combination (bcc) for each of one or more <query, cc> pairs with the context structure. For <query, cc>, the recommender 530 may select from the training samples those including <query> and calculate a recommendation performance over different context combinations. The recommender 530 may select the context combination that has a best performance (e.g., optimized, maximized, etc.) as a best context combination (bcc) for <query,cc>.

Figure 6:
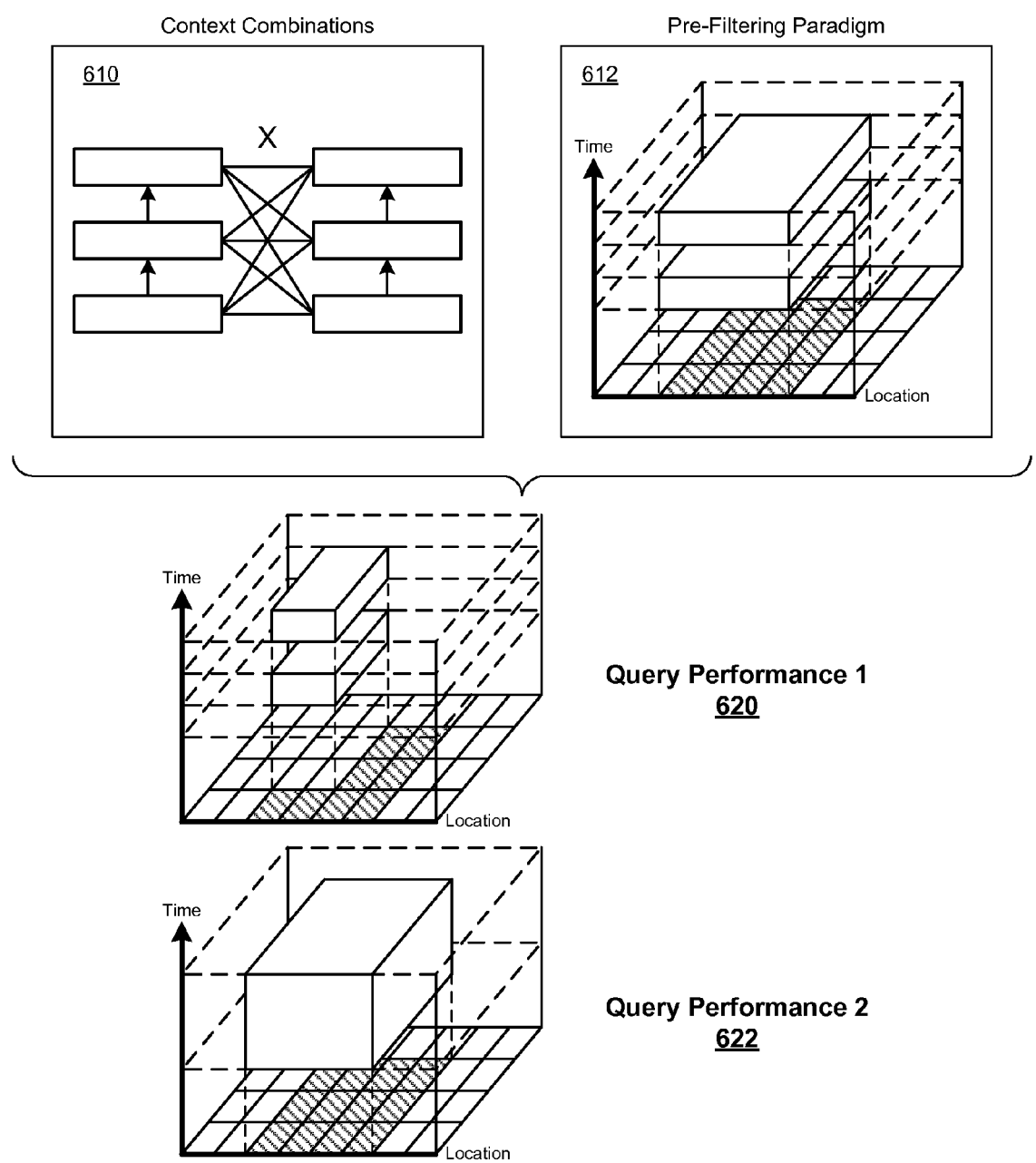
FIG. 6 is a diagram illustrating an example procedure, in accordance with aspects of the disclosure.

FIG. 6 is a diagram illustrating an example procedure 600, in accordance with aspects of the disclosure. For example, in an implementation, FIG. 6 demonstrates a training procedure for one sample query. To decide a best context combination (bcc) for <query, location, time>, the data may be pre-filtered with the pre-filtering paradigm 612 (e.g., as described in reference to FIG. 4) according to the possible context combinations 610 (e.g., the 9 possible context combinations, as described in reference to FIGS. 3A-3B). Based on different selected data, one or more query recommendation performances 620, 622 (e.g., precision) may be calculated and compared with the historic data, as described in reference to the high-dimensional cube space. As shown in FIG. 6, the one or more query recommendation performances may include a first query performance 620 and a second query performance 622. In various examples, after all applicable training samples are run, the training process may return the context combination that has the best performance. In the example of FIG. 6, the best context combination (bcc) and the best performance may be the first query performance 620.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
   a context aware recommendation manager configured to cause the at least one processor to provide one or more recommendations to a user in response to a query related to the user by integrating contextual information of a context of the user in a recommendation model while considering a granular structure of the context and the contextual information thereof, structural elements of the granular structure including at least a multiple of granular elements for location arranged in a hierarchy of levels along a location context granularity path, and a multiple of granular elements for time arranged in a hierarchy of levels along a time context granularity path, wherein context combination paths of the context are formed by a cross product of all context granularity paths in the granular structure, and wherein the context aware recommendation manager includes:
      a multi-granular context module configured to detect the context of the user related to the query and determine the granular structure of the context including one or more structural elements of the granular structure based on the contextual information that characterizes the information related to the user;
a pre-filtering recommendation paradigm module configured to pre-filter the contextual information according one or more context combination paths between different structural elements of the granular structure and select historical network navigation data related to the user for comparison of the context combination paths; and
a recommendation builder configured to:
model each context combination path for the query in the recommendation model by calculating a recommendation performance for each different context combination path as compared with the selected historical network navigation data while considering the granular structure of the context and the contextual information thereof, and
determine at least one of the context combination paths as having a best recommendation performance to provide the one or more recommendations to the user in response to the query.

2. The system of claim 1, wherein the context includes multiple contexts and each of the multiple contexts includes a hierarchical structure with a multi-granular organization.

3. The system of claim 1, wherein the contextual information associated with the context reveals an intent of the user for a query, the contextual information including time and location of the query issued by the user, and the recommendation builder is configured to select the best context combination for <query, location, time>.

4. The system of claim 1, wherein the contextual information associated with the context includes a profile of the user including one or more of gender of the user, age of the user, personal interest of the user, salary of the user, likes and dislikes of the user, and one or more social networks associated with the user.

5. The system of claim 1, wherein the structural elements of the granular structure of the context and the contextual information related to the user include one or more granular levels and one or more granular components within each granular level.

6. The system of claim 1, wherein the multi-granular context module is configured to automatically detect the context related to the user based on the historical network navigation data related to the user.

7. The system of claim 1, wherein the multi-granular context module is configured to automatically detect dependencies between the structural elements of the context and the contextual information related to the user including dependencies between one or more granular levels and one or more granular components within each granular level.

8. The system of claim 1, the recommendation builder further comprising:
a trainer module configured to automatically discover one or more potentially predictive relationships and dependencies between the structural elements of the granular structure of the context and the contextual information related to the user; and
a recommender module configured to automatically detect the one or more best context combinations for the query as a context aware recommendation provided to the user.

9. A computer-implemented method, comprising:
providing one or more recommendations to a user in response to a query related to the user by integrating contextual information of a context related to the user in a recommendation model while considering a granular structure of the context and the contextual information thereof, structural elements of the granular structure including at least a multiple of granular elements for location arranged in a hierarchy of levels along a location context granularity path, and a multiple of granular elements for time arranged in a hierarchy of levels along a time context granularity path, wherein context combination paths of the context are formed by a cross product of all context granularity paths in the granular structure, and wherein the providing includes:
detecting the context of the user,
determining the granular structure of the context including one or more structural elements of the granular structure based on the contextual information that characterizes the information related to the user,
pre-filtering the contextual information according one or more context combination paths between different structural element of the granular structure,
selecting historical network navigation data related to the user for comparison with each of the context combination paths,
modeling each context combination path for the query in the recommendation model by calculating a recommendation performance for each different context combination path as compared with the selected historical network navigation data while considering the granular structure of the context and the contextual information thereof, and
determining at least one of the context combination paths as having a best recommendation performance to provide the one or more recommendations to the user in response to the query.

10. The method of claim 9, wherein the context includes multiple contexts and each of the multiple contexts includes a hierarchical structure with a multi-granular organization.

11. The method of claim 9, wherein the contextual information associated with the context reveals an intent of the user for a query, the contextual information including time and location of the query issued by the user, and the recommendation builder is configured to select the best context combination for <query, location, time>.

12. The method of claim 9, wherein the contextual information associated with the context includes a profile of the user including one or more of gender of the user, age of the user, personal interest of the user, salary of the user, likes and dislikes of the user, and one or more social networks associated with the user.

13. The method of claim 9, wherein the structural elements of the granular structure of the context and the contextual information related to the user include one or more granular levels and one or more granular components within each granular level.

14. The method of claim 9, the method further comprising:
automatically detecting the context related to the user based on the historical network navigation data related to the user;
automatically detecting dependencies between the structural elements of the context and the contextual information related to the user including dependencies between one or more granular levels and one or more granular components within each granular level;
automatically discovering one or more potentially predictive relationships and dependencies between the structural elements of the granular structure of the context and the contextual information related to the user; and
automatically detecting the one or more best context combinations for the query as a context aware recommendation provided to the user.

15. A computer program product, the computer program product being tangibly embodied on a non-transitory computer-readable storage medium and including instructions that, when executed by at least one processor, are configured to:
provide one or more recommendations to a user in response to a query related to the user by integrating contextual information of a context related to the user in a recommendation model while considering a granular structure of the context and the contextual information thereof, structural elements of the granular structure including at least a multiple of granular elements for location arranged in a hierarchy of levels along a location context granularity path, and a multiple of granular elements for time arranged in a hierarchy of levels along a time context granularity path, wherein context combination paths of the context are formed by a cross product of all context granularity paths in the granular structure, by
detecting the context of the user related to the query,
determining the granular structure of the context including one or more structural elements of the granular structure based on the contextual information that characterizes the information related to the user,
pre-filtering the contextual information according one or more context combination paths between each structural element of the granular structure,
selecting historical network navigation data related to the user for comparison with each of the context combination paths,
modeling each context combination path for the query in the recommendation model by calculating a recommendation performance for each different context combination path as compared with the selected historical network navigation data while considering the granular structure of the context and the contextual information thereof, and
determining at least one of the context combination paths as having a best recommendation performance to provide the one or more recommendations to the user in response to the query.

16. The computer program product of claim 15, wherein the context includes multiple contexts and each of the multiple contexts includes a hierarchical structure with a multi-granular organization.

17. The computer program product of claim 15, wherein the contextual information associated with the context reveals an intent of the user for a query, the contextual information including time and location of the query issued by the user, and the recommendation builder is configured to select the best context combination for <query, location, time>.

18. The computer program product of claim 15, wherein the contextual information associated with the context includes a profile of the user including one or more of gender of the user, age of the user, personal interest of the user, salary of the user, likes and dislikes of the user, and one or more social networks associated with the user.

19. The computer program product of claim 15, wherein the structural elements of the granular structure of the context and the contextual information related to the user include one or more granular levels and one or more granular components within each granular level.

20. The computer program product of claim 15, further comprising instructions that, when executed by the processor, are configured to:
automatically detect the context related to the user based on the historical network navigation data related to the user;
automatically detect dependencies between the structural elements of the context and the contextual information related to the user including dependencies between one or more granular levels and one or more granular components within each granular level;
automatically discover one or more potentially predictive relationships and dependencies between the structural elements of the granular structure of the context and the contextual information related to the user; and
automatically detect the one or more best context combinations for the query as a context aware recommendation provided to the user.

* * * * *